Oct. 10, 1950 — E. H. LEHMAN — 2,524,914
FRICTION SHOCK ABSORBING MECHANISM
Filed July 13, 1948 — 2 Sheets-Sheet 1
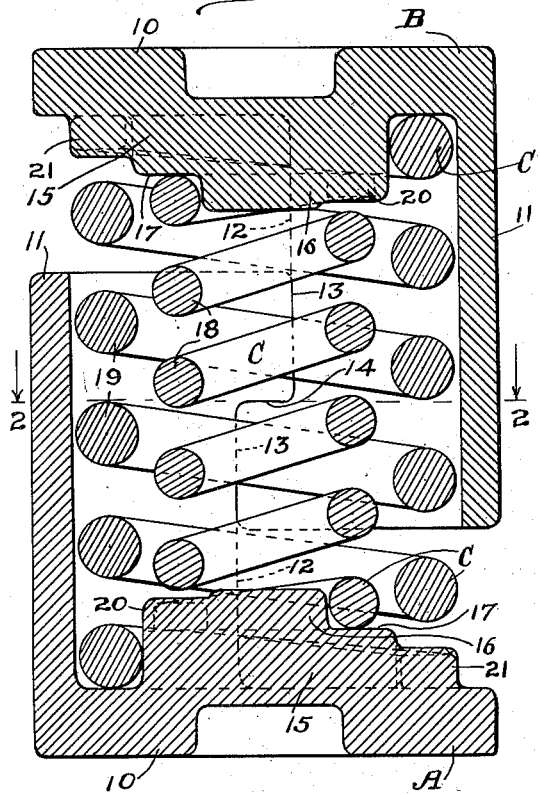
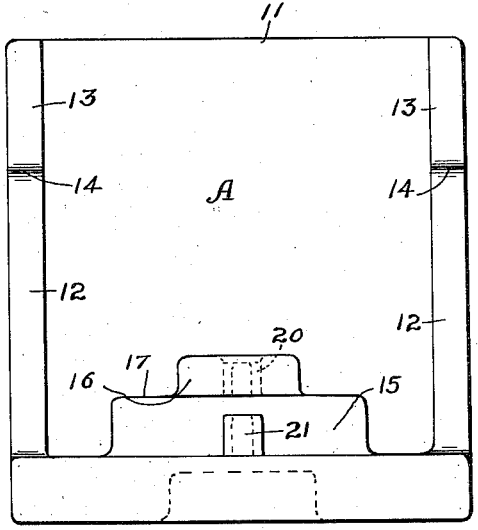
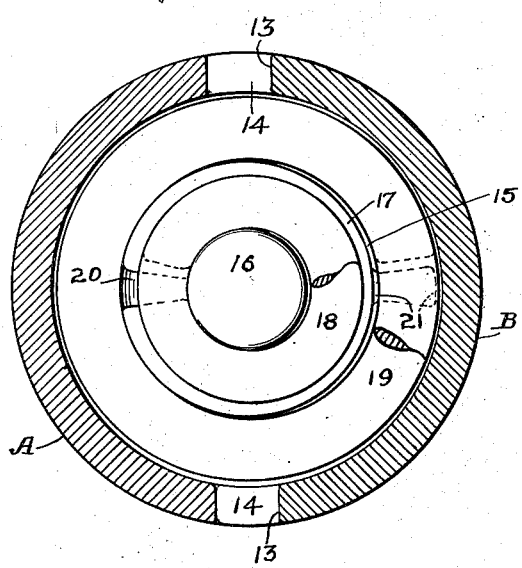
Inventor:
Edward H. Lehman.
By Henry Fuchs.
Atty.

Oct. 10, 1950  E. H. LEHMAN  2,524,914
FRICTION SHOCK ABSORBING MECHANISM
Filed July 13, 1948  2 Sheets-Sheet 2

Inventor:
Edward H. Lehman
By Henry Fuchs.
Atty.

Patented Oct. 10, 1950

2,524,914

UNITED STATES PATENT OFFICE 2,524,914

FRICTION SHOCK ABSORBING MECHANISM

Edward H. Lehman, Chicago, Ill., assignor to W. H. Miner, Inc., Chicago, Ill., a corporation of Delaware Application July 13, 1948, Serial No. 38,457

18 Claims. (Cl. 267—9)

This invention relates to improvements in friction shock absorbing mechanisms, especially adapted for use as snubbing devices for springs of railway car trucks.

One object of the invention is to provide a shock absorbing mechanism having spring and frictional resistance to snub the action of the usual truck springs of a railway car, comprising relatively movable, hollow friction shells having longitudinally extending edge faces in sliding frictional engagement with each other, and spring means opposing relative lengthwise movement of said shells, comprising a spring element enclosed within the shells, wherein the spring element, in addition to opposing relative lengthwise movement of the shells, exerts lateral pressure thereon to force the friction surfaces into firm contact with each other.

A further object of the invention is to provide a mechanism, as set forth in the preceding paragraph, wherein the spring element is in the form of a helically coiled spring under tension in canting direction to exert the necessary pressure on the friction casings to hold the friction surfaces thereof in tight frictional engagement with each other.

Other objects of the invention will more clearly appear from the description and claims hereinafter following.

Figure 4:
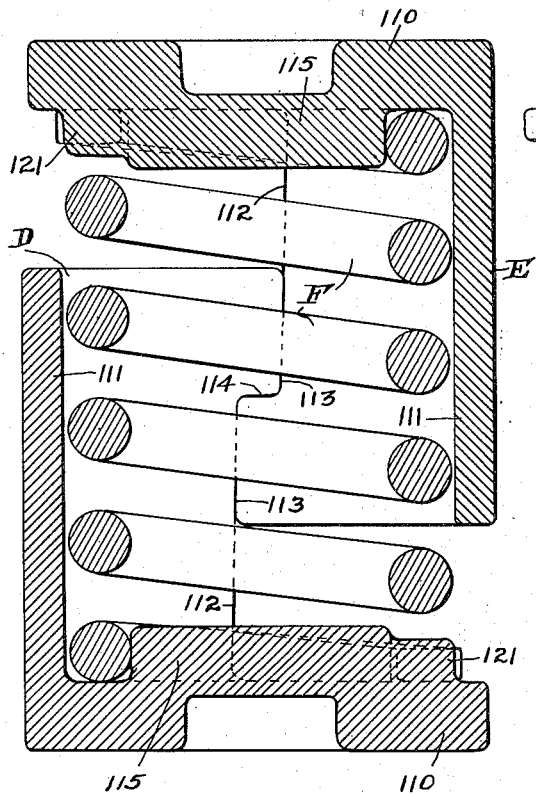
Figure 6:
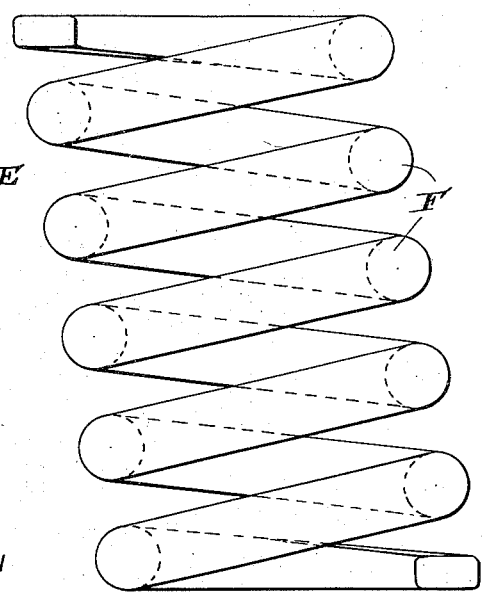
Figure 5:
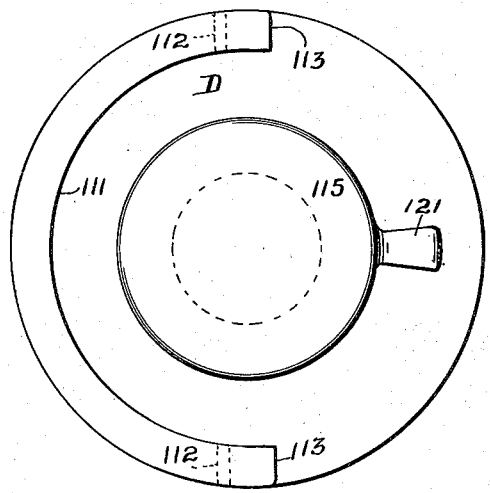

In the accompanying drawings forming a part of this specification, Figure 1 is a central longitudinal, vertical sectional view of my improved shock absorbing mechanism. Figure 2 is a horizontal sectional view, corresponding substantially to the line 2—2 of Figure 1. Figure 3 is a side elevational view of the lower shell of my improved mechanism, looking from right to left in Figure 1. Figure 4 is a view, similar to Figure 1, illustrating another embodiment of the invention. Figure 5 is a top plan view of the lower shell of the improved mechanism illustrated in Figure 4. Figure 6 is an elevational view of the canted or inclined form of helical coil spring employed in the mechanism illustrated in Figure 4.

Referring first to the embodiment of the invention illustrated in Figures 1, 2, and 3, my improved shock absorber comprises broadly lower and upper friction shells or hollow posts A and B having longitudinally extending, interengaging edge faces in frictional sliding contact with each other, and a spring resistance C opposing relative lengthwise movement of the shells or posts and holding the same in frictional engagement with each other.

The shells A and B are of identical design, but reversely arranged, the shell B being inverted with respect to the shell A.

Each shell comprises a substantially cylindrical, disclike base portion 10 and a transversely curved, semi-cylindrical side wall 11, the side wall 11 of the lower shell A upstanding from the base portion thereof, and the wall 11 of the upper shell depending from its base portion. As seen in Figure 1, the wall 11 is at the left hand side of the base portion 10 of the lower shell A and the wall 11 of the upper shell B is at the right hand side of the base portion thereof. The two longitudinal edge portions of the semi-cylindrical side wall of each shell are cut away inwardly of the outer end of the shell, as shown in Figure 1, each longitudinal edge portion thus presenting a lengthwise extending inner friction surface 12, a lengthwise extending outer friction surface 13 laterally outwardly offset with respect to the surface 12, and a transverse shoulder 14 between said surfaces. The friction surfaces 12 and 13 of the two longitudinal side edge portions of each casing preferably extend vertically and engage respectively with the surfaces 13 and 12 of the other casing. In the assembled condition of the mechanism, the shoulders 14—14 are in overhanging relation and are engageable with each other to limit longitudinal separation of the shells, as shown in Figure 1.

The disclike base portion 10 of each shell is provided with an inwardly extending, substantially cylindrical, central boss 15 having a reduced, inwardly projecting, central portion 16 of cylindrical cross section providing an annular shoulder 17 forming a seat for the inner coil of the spring resistance C.

The disclike base portion 10 of each shell also has an outwardly opening, central seat therein, adapted to receive the usual centering projections of the corresponding spring follower plate of the truck spring cluster.

The spring C comprises an inner light helical coil 18 and an outer heavier helical coil 19. The coils 18 and 19 are arranged within the shells A and B, the inner coil being seated on the shoulders 17 of the base portions of the shells A and B and having the reduced projections 16—16 engaged within the ends thereof, and the outer coil being seated on said base portions and having the bosses 15—15 engaged within the ends thereof.

Each of the helical coil springs 18 and 19, in the assembled condition of the mechanism, is under tension to cant, that is, it is formed so that it forcibly tends to assume an inclined or leaning position toward the right from the position shown in Figure 1, thereby forcing the shells into frictional contact with each other, the inner side of the upper coil of the spring 18 and the inner side of the upper coil of the spring 19, at the left hand side of the mechanism, being pressed against the corresponding sides of the projection 16 and the boss 15, respectively, of the upper shell, and the inner sides of the lower coils of the springs 18 and 19, at the right hand side of the mechanism, against the corresponding sides of the projection 16 and the boss 15, respectively, of the lower shell. The pressure thus exerted by the canting tension of the springs 18 and 19 forces the friction surfaces of the shells into tight frictional engagement with each other. To prevent rotary displacement of the springs, the base portion of each of the shells is provided with stop lugs 20 and 21 with which the ends of the tangs of the springs are engageable. The stop lug 20 of each shell projects from the boss 15 thereof and extends substantially radially to the cylindrical projection 16, and the lug 21 of each shell projects from the base of the shell and extends radially to the boss 15. The lugs 20 and 20 of the shells A and B are shown as located at the diametrically opposite sides of the mechanism, the tang at the lower end of the spring 18 being engaged in back of the lug 20 of the lower casing and the tang at the upper end of this spring being engaged in back of the lug 20 of the upper shell. The lugs 21 and 21 of the lower and upper shells A and B are also arranged at diametrically opposite sides of the mechanism and the tangs of the spring 19 are engaged in back of the same in a manner similar to the spring 18.

In the assembled condition of the mechanism, the springs 18 and 19 are preferably under initial compression. The springs 18 and 19, as manufactured, are of special design, to produce the canting tension when assembled with the shells A and B, each spring being coiled on an axis which is inclined with respect to the central vertical axis of its base, that is, coiled in such a manner that it leans to one side when stood on end on its base and tends to assume or return to the leaning or inclined position when forcibly righted by flexing the same toward upright position. An example of such a spring is shown in Figure 6, wherein the spring illustrated is that employed in the embodiment of the invention illustrated in Figures 4 and 5 and is indicated by F. This spring F is substantially identical with the outer coil spring 19 employed in the embodiment of the invention illustrated in Figures 1, 2, and 3. As illustrated in Figure 6, the spring F is coiled in such a manner when manufactured that it leans to the left when stood on its base. Thus, when this spring is forcibly flexed toward its upright position, it is placed under tension, its inherent resiliency tending to force the same to assume its leaning position, thereby exerting pressure toward the left at the top and toward the right at the bottom. By the employment of the leaning spring structure, which is righted when assembled with the friction shells, all parts of the mechanism are held in the upright position and proper alignment of the parts of the shock absorbing mechanism during all stages of the operation of the same is maintained.

In assembling the mechanism illustrated in Figures 1, 2, and 3, the shells A and B are telescoped over the springs, compressing the latter until the shoulders 14—14 and 14—14 pass each other and snap into engagement to lock the shells against lengthwise separation.

The improved shock absorbing mechanism shown in Figures 1, 2, and 3 is substituted for one or more of the coil spring units of a cluster of truck springs of a railway car, the same being interposed between the top and bottom spring follower plates of said cluster.

The operation of the improved shock absorbing mechanism shown in Figures 1, 2, and 3 is as follows: Upon the spring cluster of the truck of a railway car being compressed between the spring follower plates of the cluster, the improved shock absorber, which is interposed between said follower plates, is also compressed, the shells B and A being moved relatively to each other in lengthwise direction against the resistance of the springs 18 and 19. Inasmuch as the friction surfaces 12 and 13 and 12 and 13 of the two shells are in sliding engagement with each other and are pressed together by the action of the springs 18 and 19, the desired frictional resistance required to snub the action of the truck springs is provided.

During recoil of the truck springs, expansion of the springs 18 and 19 returns all of the parts to the normal position shown in Figure 1, lengthwise separation of the shells being limited by engagement of the shoulders 14—14 with each other.

As will be evident, the frictional resistance provided is substantially uniform throughout the compression and expansion strokes of the mechanism.

Referring next to the embodiment of the invention illustrated in Figures 4, 5, and 6, the construction is substantially the same as that shown in Figures 1, 2, and 3, with the exceptions that only a single helical coil spring is employed and that the friction surfaces of the casings are slightly inclined to the vertical.

As illustrated in Figures 4, 5, and 6, the improved mechanism comprises a lower friction shell D, an upper friction shell E, and a helical coil spring F.

Each friction shell D and E comprises a base 110 and a side wall 111, similar to the base 10 and side wall 11 of the shell hereinbefore described. The side wall of each shell D and E has lengthwise extending friction surfaces 112 and 113 on the two longitudinal side edge portions thereof, and a stop shoulder 114 between each set of friction surfaces, similar to the surfaces 12, 13, and the stop shoulder 14 hereinbefore described, however, the friction surfaces 112 and 113 are shown as slightly inclined to the vertical, thus increasing the pressure of the spring F as the mechanism is compressed. The spring F, which is identical with the outer coil 19 hereinbefore described in connection with the embodiment of the invention illustrated in Figures 1, 2, and 3, is disposed within the shells D and E and has its top and bottom ends bearing on the base portions 110 and 110 of said shells. A boss 115, similar to the boss 15, is provided on the base portion of each shell which extends into the corresponding end of the helical spring. As shown in Figure 4, the spring F has the inner side of the lower coil bearing on the outer side of the boss 115 of the lower shell at the left hand side of the mechanism and the inner side of the upper coil bearing on the outer side of the boss 115 of the upper shell at the right hand side of the mechanism and operates in precisely the same manner as the spring 19 hereinbefore described. Rotary displacement of the coil F is prevented by stop lugs 121—121 on the base portions of the top and bottom shells, similar to the lugs 21—21 hereinbefore described.

The operation of the mechanism shown in Figures 4, 5, and 6 is similar to that of the mechanism shown in Figures 1, 2, and 3, with the exception that in compression of the mechanism the shells are wedged laterally apart against the resistance of the spring F by the action of the inclined friction surfaces, thus providing increasing frictional resistance as compression of the mechanism progresses.

I claim:

1. In a shock absorbing mechanism, the combination with a pair of relatively lengthwise slidable friction shells having interengaging, longitudinally extending friction surfaces along their edges at diametrically opposite sides of the mechanism; of a coil spring within said shells opposing relative movement thereof in lengthwise direction toward each other; and spring abutment means interiorly of said shells, the top end coil of said spring having lateral engagement at one side only of the mechanism with the abutment means of said top shell, and the bottom end coil of said spring having lateral engagement at the opposite side only of the mechanism with the abutment means of the bottom shell to force said shells edgewise laterally toward each other.

2. In a shock absorbing mechanism, the combination with a pair of relatively lengthwise slidable friction shells having interengaging, longitudinally extending friction surfaces at diametrically opposite sides of the mechanism; of a helical coil spring under tension in canting direction within said shells, said spring having lateral bearing engagement at opposite ends of the mechanism with said shells to force the same laterally toward each other into tight frictional contact, said spring having its opposite ends engaged with said shells, respectively, to yieldingly oppose relative approach of the same in lengthwise direction.

3. In a shock absorbing mechanism, the combination with a pair of relatively lengthwise slidable friction shells having interengaging, longitudinally extending friction surfaces at diametrically opposite sides of the mechanism; of a helical coil spring under tension in canting direction within said shells opposing relative movement thereof in lengthwise direction toward each other; and spring abutment means interiorly of each shell, the top end portion of said spring having lateral bearing engagement at one side of the mechanism with the abutment means of said top shell, and the bottom end portion of said spring having lateral engagement at the opposite side of the mechanism with the abutment means of the lower shell to force said shells laterally toward each other into tight frictional contact.

4. In a shock absorbing mechanism, the combination with a pair of relatively lengthwise slidable friction shells having interengaging, longitudinally extending, vertically disposed friction surfaces along their edges at diametrically opposite sides of the mechanism; of a coil spring within said shells opposing relative movement thereof in lengthwise direction toward each other; and spring abutment means interiorly of said shells, the top end coil of said spring having lateral engagement at one side only of the mechanism with the abutment means of said top shell, and the bottom end coil of said spring having lateral engagement at the opposite side only of the mechanism with the abutment means of the bottom shell to force said shells edgewise laterally toward each other.

5. In a shock absorbing mechanism, the combination with a pair of relatively lengthwise slidable friction shells having interengaging, longitudinally extending, inclined friction surfaces along their edges at diametrically opposite sides of the mechanism; of a coil spring within said shells opposing relative movement thereof in lengthwise direction toward each other; and spring abutment means interiorly of said shells, the top end coil of said spring having lateral engagement at one side only of the mechanism with the abutment means of said top shell, and the bottom end coil of said spring having lateral engagement at the opposite side only of the mechanism with the abutment means of the bottom shell to force said shells edgewise laterally toward each other.

6. In a shock absorbing mechanism, the combination with a pair of relatively lengthwise slidable friction shells having interengaging, longitudinally extending, vertically disposed friction surfaces at diametrically opposite sides of the mechanism; of a helical coil spring under tension in canting direction within said shells, said spring having lateral bearing engagement at opposite ends of the mechanism with said shells to force the same laterally toward each other into tight frictional contact, said spring having its opposite ends engaged with said shells, respectively, to yieldingly oppose relative approach of the same in lengthwise direction.

7. In a shock absorbing mechanism, the combination with a pair of relatively lengthwise slidable friction shells having interengaging, longitudinally extending, vertically disposed friction surfaces at diametrically opposite sides of the mechanism; of a helical coil spring under tension in canting direction within said shells opposing relative movement thereof in lengthwise direction toward each other; and spring abutment means interiorly of each shell, the top end portion of said spring having lateral bearing engagement at one side of the mechanism with the abutment means of said top shell, and the bottom end portion of said spring having lateral engagement at the opposite side of the mechanism with the abutment means of the lower shell to force said shells laterally toward each other into tight frictional contact.

8. In a shock absorbing mechanism, the combination with a pair of relatively lengthwise slidable friction shells having interengaging, longitudinally extending friction surfaces at diametrically opposite sides of the mechanism; of inner and outer helical coil springs within said shells opposing relative movement thereof in lengthwise direction toward each other; and spring abutment means interiorly of said shells, the top end coil of each of said springs having lateral engagement at one side of the mechanism with the abutment means of said top shell, and the bottom end coil of each of said springs having lateral engagement at the opposite side of the mechanism with the abutment means of the bottom shell to force said shells laterally toward each other.

9. In a shock absorbing mechanism, the combination with a pair of relatively lengthwise slidable friction shells having interengaging, longitudinally extending friction surfaces at diametrically opposite sides of the mechanism; of inner and outer helical coil springs under tension in canting direction within said shells opposing relative movement thereof in lengthwise direction toward each other; and spring abutment means interiorly of each shell, the top end portion of each of said springs having lateral bearing engagement at one side of the mechanism with the abutment means of said top shell, and the bottom end portion of each of said springs having lateral engagement at the opposite side of the mechanism with the abutment means of the lower shell to force said shells laterally toward each other into tight frictional contact.

10. In a shock absorbing mechanism, the combination with a pair of movable friction members at opposite ends of the mechanism, said members being movable toward and away from each other lengthwise of the mechanism, each member including a trough-shaped friction shell section extending inwardly lengthwise of the mechanism, the hollow sides of said friction shell sections of said members facing each other, said shell sections having longitudinally extending, interengaging friction surfaces at diametrically opposite sides of the mechanism, said friction surfaces of said shells being transversely aligned; of a lengthwise extending coil spring means opposing relative movement of said members toward each other, and having lateral bearing engagement at opposite ends with said members to press the same laterally inwardly toward each other.

11. In a friction shock absorbing mechanism, the combination with a pair of lengthwise disposed friction shells at opposite ends of the mechanism, said shells being movable toward and away from each other lengthwise of the mechanism, said shells including overlapping, semi-cylindrical sections extending inwardly of the mechanism provided with longitudinally extending, interengaging friction surfaces along their side edges, said surfaces being at diametrically opposite sides of the mechanism in transverse alignment, the inwardly extending section of each shell having its inner end spaced inwardly from the outer end of the other shell in the normal full release position of the mechanism; of a coil spring extending lengthwise of the mechanism within the shells and embraced between said semi-cylindrical sections, said spring yieldingly opposing relative lengthwise movement of said shells toward each other and having lateral bearing engagement at opposite ends thereof with said shells to force the same laterally inwardly toward each other.

12. In a shock absorbing mechanism, the combination with a pair of lengthwise extending friction members at opposite ends of the mechanism, each member including an inwardly extending shell section, said members being staggered lengthwise with respect to each other in the normal full release position of the mechanism, said members being movable lengthwise toward and away from each other and the shell sections thereof having interengaging friction surfaces at diametrically opposite sides of the mechanism, said surfaces being in transverse alignment, each member having a transverse spring abutment face at the outer end thereof; of a coil spring disposed lengthwise of the mechanism and bearing at opposite ends on said abutment faces of said members, said spring having lateral bearing engagement at opposite ends with said members to force the same laterally inwardly toward each other.

13. In a shock absorbing mechanism, the combination with a pair of friction shells at opposite ends of the mechanism movable toward and away from each other, said shells having inwardly extending, lengthwise disposed, inner end sections of semi-cylindrical cross section, the inner end of said section of each shell being spaced inwardly from the outer end of the other shell in the normal full release position of the mechanism, said sections of said pair of shells being in sliding engagement with each other and having interengaging friction surfaces at diametrically opposite sides of the mechanism, said friction surfaces being inclined lengthwise of the mechanism, all of said surfaces being inclined in the same direction; of a lengthwise extending coil spring opposing relative movement of said shells toward each other, said spring at opposite ends thereof having lateral bearing engage with said shells to press the same laterally inwardly toward each other.

14. In a friction shock absorbing mechanism, the combination with a pair of lengthwise disposed friction members movable toward and away from each other lengthwise of the mechanism, said members including lengthwise, inwardly extending shell sections having longitudinally extending, interengaging friction surfaces at opposite sides of the mechanism in transverse alignment; of a lengthwise extending, helical coil spring embraced between said shell sections and opposing relative movement of said members toward each other, said spring being under tension in canting direction and having lateral engagement at opposite ends with said members to press the same laterally inwardly toward each other to press said friction surfaces against each other.

15. In a friction shock absorbing mechanism, the combination with a pair of lengthwise disposed friction members at opposite ends of the mechanism, movable toward and away from each other lengthwise of the mechanism, each member including a lengthwise extending, hollow shell portion, said shell portions having the hollow sides facing each other, with their longitudinally extending side walls in edge to edge engagement, said engagement being on straight friction surfaces extending lengthwise of the mechanism; of lengthwise extending coil spring means opposing relative movement of said members toward each other, said spring means at opposite ends thereof having lateral bearing engagement with said members, respectively, to exert lateral inward pressure on said shell portions to force the same into tight frictional contact with each other at said friction surfaces.

16. In a shock absorbing mechanism, the combination with a pair of lengthwise extending friction members in lengthwise staggered relation in normal full release of the mechanism, said members being movable toward and away from each other lengthwise of the mechanism, said members including shell portions of U-shaped, transverse cross section provided along their edges with friction surfaces in lengthwise sliding engagement with each other, said edges being straight and extending lengthwise of the mechanism; of lengthwise extending coil spring means embraced between said shell portions and having shouldered engagement at opposite ends with said members to yieldingly oppose relative movement of said members toward each other, said spring means at opposite ends thereof exerting lateral inward pressure on said members to press the friction surfaces of the shell portions thereof into tight contact with each other.

17. In a shock absorbing mechanism, the combination with a pair of friction shells movable lengthwise toward and away from each other, said shells having longitudinally extending, interengaging friction surfaces at opposite sides of the mechanism; of a lengthwise extending coil spring yieldingly opposing relative movement of said shells toward each other in lengthwise direction, interior bosses on said shells respectively engaged in opposite ends of said spring, said spring having lateral bearing engagement at one end with the boss of one of said shells at one side of the mechanism, and lateral bearing engagement at the other end with the boss of the other of said shells at the opposite side of the mechanism to force said shells laterally inwardly toward each other into tight frictional contact along their friction surfaces.

18. In a friction shock absorbing mechanism, the combination with a pair of friction shells having lengthwise extending side wall portions in edge to edge frictional engagement with each other along lengthwise extending, inclined friction surfaces; of spring abutment means interiorly of each shell; and a lengthwise extending coil spring yieldingly opposing relative movement of said shells toward each other in lengthwise direction, said spring at one end thereof having lateral bearing engagement with the interior abutment means of one of said shells at one side of the mechanism, and at the other end thereof lateral bearing engagement with the interior abutment means of the other of said shells at the opposite side of the mechanism to force said shells laterally inwardly toward each other into tight frictional contact along their friction surfaces.

EDWARD H. LEHMAN.

REFERENCES CITED

The following references are of record in the file of this patent:

UNITED STATES PATENTS

| Number | Name | Date |
|---|---|---|
| 1,255,214 | O'Connor | Feb. 5, 1918 |
| 1,924,814 | Sproul | Aug. 29, 1933 |
| 2,395,171 | Dath | Feb. 19, 1946 |
| 2,410,160 | Haseltine | Oct. 29, 1946 |
| 2,410,165 | Johnson et al. | Oct. 29, 1946 |
| 2,444,989 | Haseltine | July 13, 1948 |